(12) United States Patent
Sun et al.

(10) Patent No.: US 12,293,231 B2
(45) Date of Patent: May 6, 2025

(54) PACKET PROCESSING LOAD BALANCER

(71) Applicant: Intel Corporation, Santa Clara, CA (US)

(72) Inventors: Chenmin Sun, Shanghai (CN); Yipeng Wang, Portland, OR (US); Rahul R. Shah, Chandler, AZ (US); Ren Wang, Portland, OR (US); Sameh Gobriel, Dublin, CA (US); Hongjun Ni, Shanghai (CN); Mrittika Ganguli, Chandler, AZ (US); Edwin Verplanke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 17/471,889

(22) Filed: Sep. 10, 2021

(65) Prior Publication Data
US 2023/0082780 A1 Mar. 16, 2023

(51) Int. Cl.
G06F 9/50 (2006.01)
H04L 47/11 (2022.01)
H04L 47/12 (2022.01)
H04L 47/125 (2022.01)
H04L 12/70 (2013.01)

(52) U.S. Cl.
CPC ............ G06F 9/505 (2013.01); G06F 9/5083 (2013.01); H04L 2012/5678 (2013.01); H04L 47/11 (2013.01); H04L 47/12 (2013.01); H04L 47/125 (2013.01)

(58) Field of Classification Search
None
See application file for complete search history.

(56) References Cited

U.S. PATENT DOCUMENTS

| 10,686,763 | B2 | 6/2020 | Kantecki et al. | |
| 2019/0260686 | A1* | 8/2019 | Bowers | H04L 47/6255 |
| 2019/0294570 | A1* | 9/2019 | Singh | H04W 52/241 |
| 2020/0004584 | A1 | 1/2020 | Burroughs et al. | |

(Continued)

OTHER PUBLICATIONS

Vakili et al., "Hierarchical Heavy Hitter Detection Under Unknown Models", Apr. 2018, IEEE, pp. 6917-6921. (Year: 2018).*

(Continued)

Primary Examiner — Qing Yuan Wu
(74) Attorney, Agent, or Firm — Compass IP Law PC

(57) ABSTRACT

Examples described herein include a device interface; a first set of one or more processing units; and a second set of one or more processing units. In some examples, the first set of one or more processing units are to perform heavy flow detection for packets of a flow and the second set of one or more processing units are to perform processing of packets of a heavy flow. In some examples, the first set of one or more processing units and second set of one or more processing units are different. In some examples, the first set of one or more processing units is to allocate pointers to packets associated with the heavy flow to a first set of one or more queues of a load balancer and the load balancer is to allocate the packets associated with the heavy flow to one or more processing units of the second set of one or more processing units based, at least in part on a packet receive rate of the packets associated with the heavy flow.

18 Claims, 8 Drawing Sheets

(56) References Cited

U.S. PATENT DOCUMENTS

2021/0377188 A1* 12/2021 Ghag .................. H04L 49/90
2023/0052712 A1* 2/2023 Newell ................ H04L 43/04

OTHER PUBLICATIONS

Huang, Muhuan, et al., "A Scalable, High-Performance Customized Priority Queue", Hewlett Packard Labs, Sep. 3, 2014, 4 pages.
Liu, Zaoxing, et al., "NitroSketch: Robust and General Sketch-based Monitoring in Software Switches", In SIGCOMM 19: 2019 Conference of the ACM Special Interest Group on Data Communication, Aug. 19-23, 2019, Beijing, China, 17 pages.
Wang, Yipeng, et al., "Dynamic Sketch: Efficient and Adjustable Heavy Hitter Detection for Software Packet Processing", Authorized licensed use limited to: Peking University. Downloaded on Aug. 26, 2022 at 01:25:59 UTC from IEEE Xplore, 7 pages.
Yang, Tong, et al., "Elastic Sketch: Adaptive and Fast Network-wide Measurements", SIGCOMM '18, Aug. 20-25, 2018, Budapest, Hungary, 15 pages.

* cited by examiner

PACKET PROCESSING LOAD BALANCER

PRIORITY

This application claims the benefit of priority to Patent Cooperation Treaty (PCT) Application No. PCT/CN2021/110831 filed Aug. 5, 2021. The entire content of that application is incorporated by reference.

BACKGROUND

In a network interface device, Transmission Control Protocol (TCP) packets are received for many different connections. TCP connections can include TCP packets provided in a TCP session between two devices where multiple TCP packets are transmitted with the same IP addresses (e.g., destination and source) and ports (e.g., destination and source). Some TCP connections are long lived and generate a copious amounts of traffic. Some TCP connections are short lived and generate sparse amounts of traffic. If a single central processor unit (CPU) is allocated to process traffic, the single CPU can quickly become overburdened when faced with large amounts of traffic, leading to an increase in time to complete processing a packet. To alleviate this, network interface devices attempt to spread the processing of network traffic to multiple CPUs.

There are known techniques for balancing packet processing of traffic across a multiple cores. A known technique for distributing network traffic to different CPU cores is to use Receive Side Scaling (RSS). RSS provides a manner of distributing flows among a set of cores. RSS distributes network traffic to cores in a statistical way by use of a hashing calculation across multiple connections and by use of an indirection table. The number of hash buckets can correspond to a number of cores and corresponding queues in use. The hash-based distribution works well for many traffic flows. However, in some cases, if the set of flows has some long lived high traffic flows, the core selected to process the flow can become overloaded, which can increase latency of packet processing.

A known technique uses a proxy or distributor core to distribute networking flows to multiple cores. Using a core as proxy to distribute flows can create a single-point bottleneck in the system. A known technique causes a smartNIC to collect statistics of each flow to identify heavy flows, so that a core can use such information to further distribute heavy flows to other cores. However, as a smartNIC has limited on-board memory, as a number of flows increases, collecting statistics of all flows may not be possible.

DETAILED DESCRIPTION

Some examples utilize a network interface device and one or more processing units of a computing platform to perform detection of a heavy flow (e.g., elephant flow) and utilize a load balancer device to load balance packet processing of packets of a flow among processing units. A network interface device can maintain a count of a number of packets received in a particular flow based on a count-min sketch as described in "Nitrosketch: Robust and General Sketch-based Monitoring in Software Switches," Sigcomm 2019. The network interface device can report a flow that is considered heavy to the computing platform. The computing platform can maintain a heap or binary tree to bookkeep the flow keys of heavy hitters based such as based on a packet header's n-tuple. An approximated count of packets or total byte count of packets in a flow at a network interface device can be determined using count-min sketch (e.g., a 2-d array of counters).

A processing unit assigned to process packets of a flow or flows can determine if the flow or flows are heavy flows or not heavy flows. Such processing unit can enqueue packets with queues of the load balancer device and the load balancer device can determine a number of processing units to process the packets. After the processing units process the packets, the load balancer device can reorder processed packets in accordance a packet sequence number ordering, order of packet transmission, or order of packet receipt.

Figure 1:
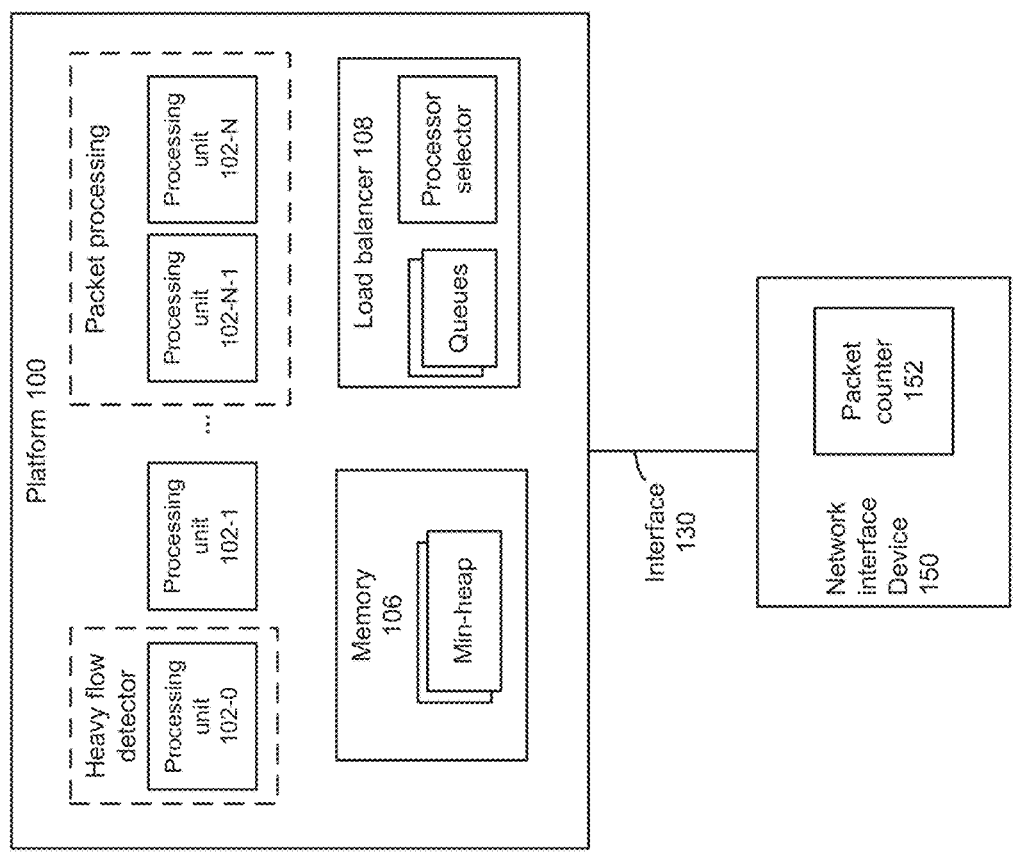
FIG. 1 depicts an example system.

FIG. 1 depicts an example system. Platform 100 can be communicatively coupled to network interface device 150 using an interface 130. In some examples, heavy flow detection can be performed at network interface device 150 and platform 100 by performing counting of packets of a flow at packet counter 152 in network interface device 150 and performing heavy hitter detection using one or more processing units among processing units 102-0 to 102-N. After classifying a flow as heavy or non-heavy, the one or more processing units that perform heavy hitter detection can provide pointers to memory addresses (virtual or physical addresses) or other identifiers of packets to queues managed by load balancer 108. For example, a group of one or more queues can store pointers of packets associated with heavy flows and another group of one or more queues can store pointers of packets associated with non-heavy flows. Load balancer 108 can select a group of one or more processing units of processing units 102-0 to 102-N to perform packet processing on packets that are part of a heavy flow and select a group of one or more processing units of processing units 102-0 to 102-N to perform packet processing on packets that are part of a non-heavy flow. After processing of packets, pointers to the processed packets can be placed in a queue associated with load balancer 108. The processed packets can be transmitted to another device using network interface device 150 or accessed by an application on platform 100.

Network interface device 150 can utilize packet counter 152 to count receive packets of a flow and provide a count-min data structure as described in "Nitrosketch: Robust and General Sketch-based Monitoring in Software Switches," Sigcomm 2019. Packet counter 152 can maintain the count-min data structure in a memory of network interface device 150. Packet counter 152 can select at least one processing unit (e.g., one or more of processing units 102-0 to 102-N) to determine if the flow is heavy or not-heavy. For example, packet counter 152 can utilize RSS to select at least one processing unit to determine if the flow is heavy or not-heavy. Packet counter 152 can report a flow that is considered heavy to the selected at least one processing unit of platform 100.

Network interface device 150 can be implemented as one or more of: network interface controller (NIC), SmartNIC, router, switch, forwarding element, infrastructure processing unit (IPU), or data processing unit (DPU). SmartNIC or programable NICs has the advantage of high in-line processing throughput with specialized hardware components, but fewer on-board hardware resources (e.g., memory). Heavy hitter detection utilizes fast processing of network interface device 150 and the flexibility of software executed by processing unit. Heavy hitter detection can be based on "Nitrosketch: robust and general sketch-based monitoring in software switches," Sigcomm 2019. The Nitro sketch algorithm includes two parts, a count-min sketch, and a heap or binary tree to bookkeep the flow keys of heavy hitters (e.g., N-tuple).

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be discriminated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Interface 130 can provide communication using one or more of the following protocols: serial peripheral interface (SPI), enhanced SPI (eSPI), System Management Bus (SMBus), I2C, MIPI I3C®, Peripheral Component Interconnect Express (PCIe), Compute Express Link (CXL). See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

Packets from a same flow can be allocated to the same one or more processing units so one processing unit can perform heavy hitter detection for entire flow. A processing unit can manage a tree of heavy hitters that are managed by the processing unit in a min-heap or binary tree in memory 106. A min-heap can include a binary tree where data associated in a node is less than (or equal to) data in the node's children. Platform 100 can maintain heaps for at least one processing unit in memory 106 to bookkeep the flow keys of heavy hitters based such as based on a packet header's n-tuple. Processing units can share a single min-heap or binary tree or maintain separate min-heaps or binary trees to reduce min-heap or binary tree locking and processing unit-to-processing unit communication associated with accessing the same min-heap.

A processing unit can query for counter information in network interface device 150. A group of one or more processing units can be allocated to perform heavy flow detection. A different group of one or more processing units can be allocated to process packets identified as heavy or non-heavy. Separating light and heavy flow processing units can isolate the performance among heavy and light flows so that an overwhelmingly large amount of heavy flows or packets of heavy flows do not affect the quality of service (QoS) of light flows, and vice versa.

Load balancer 108 can support communications between processing units and/or cores in a multi-core processing unit (also referred to as "core-to-core" or "C2C" communications) may be used by computer applications such as packet processing, high-performance computing (HPC), machine learning, and so forth. The C2C communications may include requests to send and/or receive data or read or write data. For example, a first core (e.g., a "producer" core) may generate a C2C request to send data to a second core (e.g., a "consumer" core).

Load balancer 108 can include a hardware scheduling unit to process C2C requests. The processing units or cores may be grouped into various classes, with each class being assigned a particular proportion of the C2C scheduling bandwidth. In some embodiments, load balancer 108 can include a credit-based arbiter to select classes to be scheduled based on stored credit values. The credit values may indicate how much scheduling bandwidth each class has received relative to its assigned proportion. Load balancer 108 may use the credit values to schedule each class with its respective proportion of C2C scheduling bandwidth. Load balancer 108 can be implemented as a hardware queue manager (HQM) or other load balancer improves performance and reduces latency by dynamically and efficiently distributing processing across processing units.

One or more queues associated with load balancer 108 can be allocated for heavy flows and for non-heavy flows. One or more processing units among processing units 102-0 to 102-N can execute a heavy flow detector process to determine whether one or more flows directed are heavy or not heavy. Heavy flow detector process can be based on Data Plane Development Kit (DPDK) in some examples. For example, a heavy flow detector process can identify a flow as heavy based on a min-heap or binary tree in memory 106 in accordance with Nitrosketch. For example, a heavy flow detector process can monitor a receive rate of packets of one or more flows to be processed by the processing unit, such as a count of received bytes in the flow or count of packets of the flow associated with the packet over a period of time (e.g., bytes of entire packet/second). For example, a rate of receipt of packets of a flow can be determined based on polling of receive packet descriptors. If the bit receive rate (e.g., bits/second) of received packets in a flow meets or exceeds a first threshold, the flow can be considered heavy and heavy flow detector can copy pointers to the received packets to one or more queues associated with load balancer 108 allocated for packets of a heavy flow. Note that a group of one or more queues can be available to store pointers to packets of a heavy flow, another group of one or more queues can be available to store pointers to packets of another heavy flow, and so forth.

If the byte receive rate (e.g., bytes/second or bits/second) or packet count receive rate (e.g., count/second) of received packets in a flow meets or is less than a second threshold, where the second threshold can be the same or less than the first threshold, the flow can be considered non-heavy and heavy flow detector can copy pointers of packets to one or more queues allocated for packets of a heavy flow. Note that a group of one or more queues can be available to store pointers to packets of a non-heavy flow, another group of one or more queues can be available to store pointers to packets of another non-heavy flow, and so forth.

Load balancer 108 can distribute packets of heavy flows to one or more processing units among processing units 102-0 to 102-N to process the packets. In this example, packet processing is performed by processing units 102-N−1 and 102-N, although other processing units can perform packet processing. Load balancer 108 can load balance processing of packets of heavy flows among the one or more processing units based on busyness of the processing units and compute capacity of the processing units. Load balancer 108 can increase (scale up) or decrease (scale down) a number of processing units used to process the packets.

One or more processing units allocated to perform processing of packets of a non-heavy flow can access pointers and dequeue packets from one or more non-heavy flow queues and process the packets, while another group of one or more processing units can access pointers and can dequeue packets from one or more heavy flow queues. Load balancer 108 can adjust a number of processing units that process packets of a heavy flow and adjust a number of processing units that process packets of a light flow based on whether more or fewer processing units are needed to process the packets for a particular receive rate of packets. In some examples, one or more processing units that execute heavy flow detector process can be allocated alternatively or in addition to perform packet processing of heavy or non-heavy packets.

For example, packet processing can be implemented as a service, microservice, cloud native microservice, workload, virtual machine (VM), container, or other software. Packet processing can be performed based on one or more of: Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Packet processing can include access control list (ACL), firewall, intrusion detection system, network address translation (NAT), and other operations on packets. In some examples, packet processing can include changing a destination media access control (MAC) address or other field of a packet, and a processing unit or device can enqueue the re-ordered processed packets to be transmitted from the network interface device. In some examples, the reordered processed packets can be stored for access by an application.

After processing a packet, a processing unit can enqueue a pointer to the processed packet to a queue of load balancer 108. Load balancer 108 can perform reordering of the processed packets to match a send sequence or receive sequence. For example, to reorder packets after processing, load balancer 108 can utilize sequence identifiers in received packets (e.g., TCP sequence number), sequence number assigned to packet at time of receipt to identify order of packet receipt, or time stamp of packet receipt.

One or more processing units 102-0 to 102-N can include one or more of: an XPU, infrastructure processing unit (IPU), CPU, core, CPU socket, graphics processing unit (GPU), general purpose GPU (GPGPU), accelerator device (e.g., field programmable gate arrays (FPGA) or application specific integrated circuit (ASIC)), devices on a SmartNIC (e.g., processors), network interface device, Board Management Controller (BMC), storage controller, memory controller, display engine, a peripheral device, Intel® Management or Manageability Engine (ME), Advanced Micro Devices, Inc. (AMD) Platform Security Processor (PSP), Advanced RISC Machines (ARM) core with TrustZone extension, Platform Controller Hub (PCH), and so forth.

A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. A core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

One or more of processing units 102-0 to 102-N can execute an operating system (OS). In some examples, the OS can be Linux®, Windows® Server or personal computer, Android®, MacOS®, iOS®, VMware vSphere, or any other operating system. The OS and driver can execute on a processing unit sold or designed by Intel®, ARM®, AMD®, Qualcomm®, IBM®, Texas Instruments®, among others.

Figure 2:
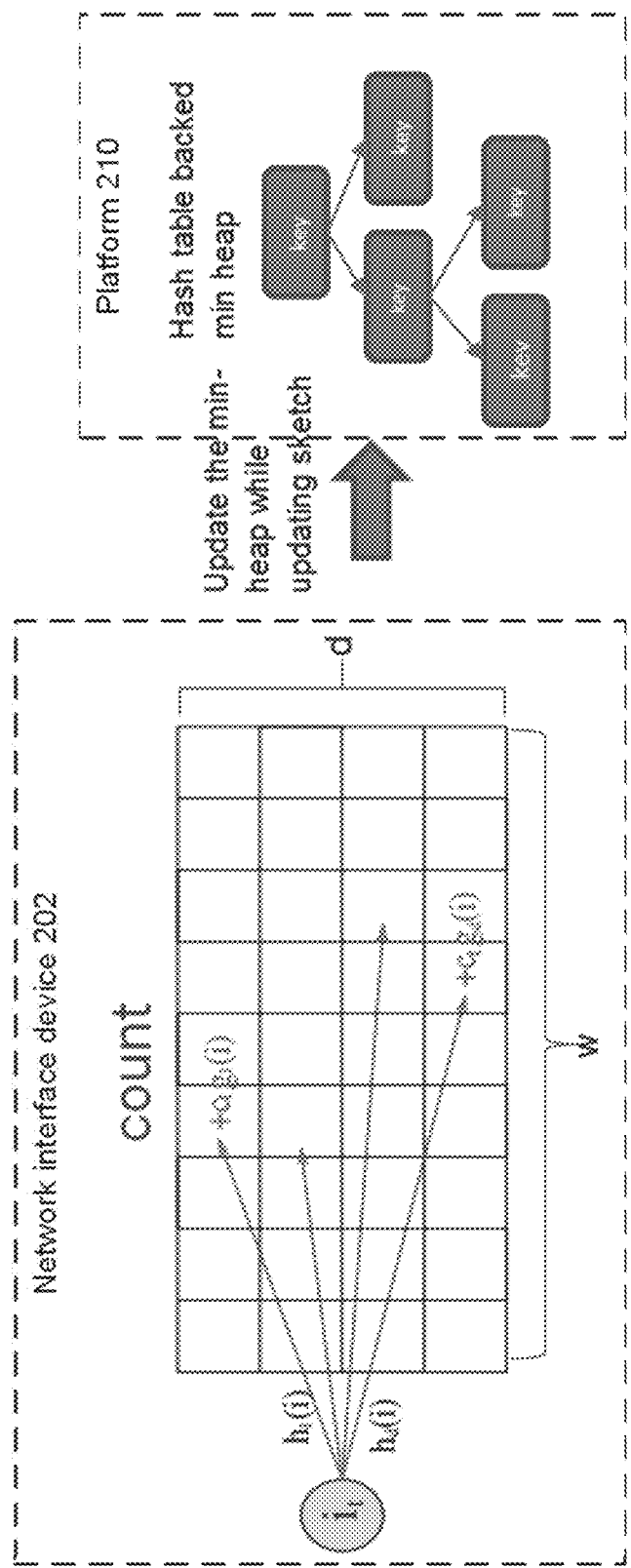
FIG. 2 depicts an example manner of detecting heavy flows.

FIG. 2 depicts an example manner of determining whether a flow is a heavy flow. In some examples, count-min sketch data can be maintained and stored in network interface device 202 and a heap or binary tree data structure can be stored in system memory of a server or computing platform, where the platform is connected using a device interface to network interface device 202 and the system memory is accessible to one or more processing units of platform 210.

In some examples, network interface device 202 can utilize programmable or fixed function hardware to generate a count-min sketch as a 2-dimensional counter array. For a 2-dimensional counter array with "d" rows and "w" columns, a packet can be hashed d times, with one hashing for a row, and for each row, a location based on the hash value can be indexed and the corresponding counter value incremented. A count of packets of a flow can be estimated by a minimum of all d corresponding counters (one for each row). The count-min sketch may not maintain a full key of each flow. For example, a size of 0(100 KB) memory can store estimated frequency of occurrences of O(1M) flows.

Count-min sketch can be accelerated and implemented by circuitry (e.g., accelerator or ASIC) in network interface device 202. A memory (e.g., static random-access memory (SRAM)) can store the 2-dimensional counter array and hardware-based hash functions (e.g., receive side scaling (RSS)) can be performed on one or more circuitry of network interface device 202.

Network interface device 202 can identify a flow that meets or exceeds a certain threshold count as a heavy flow for inclusion in the min-heap or binary tree, maintained in memory of a computing platform 210. The min-heap or binary tree can record the keys and their estimated size (e.g., packet count or total bytes) in the min-heap or binary tree. The min-heap or binary tree can maintain the top-k heavy hitters and their frequency. A key can represent a tuple of a packet. The speed of min-heap or binary tree access (e.g., read or write) can be bolstered by use of a hash table backed heap design. The heavy flows recorded in the min-heap or binary tree can be processed by a processing unit of platform 210 for analysis or used for distribution of packets of a heavy hitter flow for processing by one or more processing units. In some examples, as described herein, detection of whether a particular flow is heavy can be performed exclusively by one or more processing units.

Figure 3:
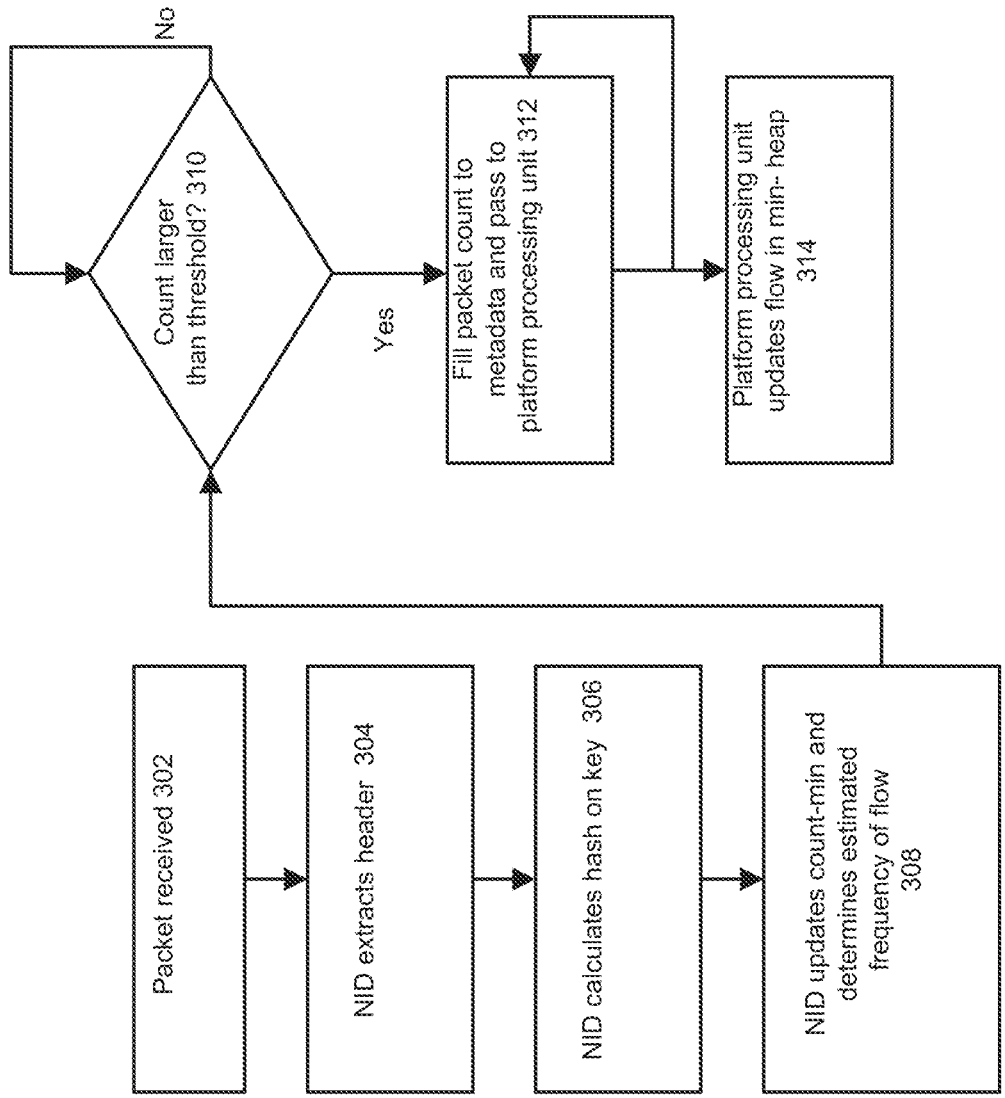
FIG. 3 depicts an example process.

FIG. 3 depicts an example process to detect a heavy flow. At 302, a packet is received at a network interface device (NID). The packet can be received at a port of the NID. At 304, the NID can access a header of the received packet or one or more header fields of the received packet. At 306, the NID can calculate a hash value on one or more header fields of the received packet. For example, the one or more header fields of the received packet can represent a key. At 308, the NID can update a count-min for a particular hash value to approximate a number of packets received for the flow. The count-min can be determined in accordance with Nitrosketch, described and referenced herein. At 310, the NID can determine if a count of received packets for a particular flow meets or exceeds a threshold level. If the count of received packets for a particular flow meets or exceeds a threshold level, the process can continue to 312, where the NID reports to the platform that the particular flow is considered heavy. If the count of received packets for a particular flow does not meet and does not exceed the threshold level, the process can repeat 310 to determine which flow, if any, is considered heavy.

At 312, the NID can inform the platform processing unit of a packet count for the identified heavy flow using meta data, descriptor, or other messaging. In some examples, the platform processing unit can be selected by RSS or other hashing scheme. At 314, the platform processing unit can update the min-heap or binary tree and identify the flow identified as heavy. Processing by the platform processing unit can continue as described in FIGS. 4A-4C.

Figure 4A:
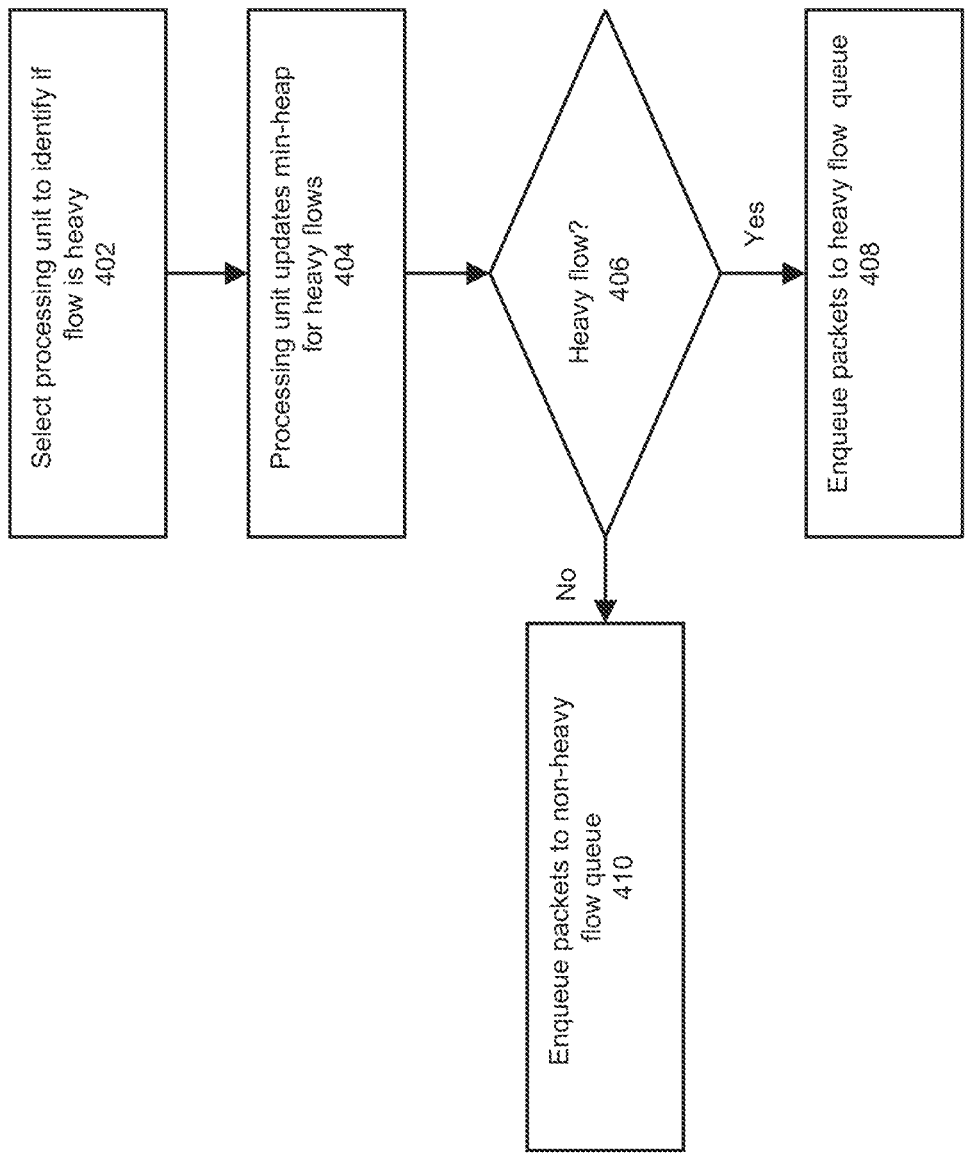
FIGS. 4A-4C depict example processes.

FIG. 4A depicts an example process. At 402, a NID can select a processing unit to perform heavy flow detection. For example, RSS can be used to cause a single processing unit to determine if a flow is considered heavy. At 404, the selected processing unit can update a min-heap or binary tree for flows identified as heavy by the NID to the computing platform processing unit. At 406, the selected processing unit can determine if the flow is considered heavy by comparing a packet count of a flow with a root of trie (tree) and if the packet count of a flow is higher than a root of trie in the min-heap or binary tree, the flow can be considered heavy. For heavy flows, the process can continue to 408, where pointers to the packets of the heavy flow can be enqueued in one or more heavy flow queues. In some cases, the one or more heavy flow queues are associated with a load balancer. The packets of the heavy flow can be processed by one or more processing units selected by the load balancer. For non-heavy flows, the process can continue to 410, where pointers to the packets of the non-heavy flow can be enqueued in one or more non-heavy flow queues. In some cases, the one or more non-heavy flow queues are associated with a load balancer. The packets of the non-heavy flow can be processed by one or more processing units selected by the load balancer.

Figure 4B:
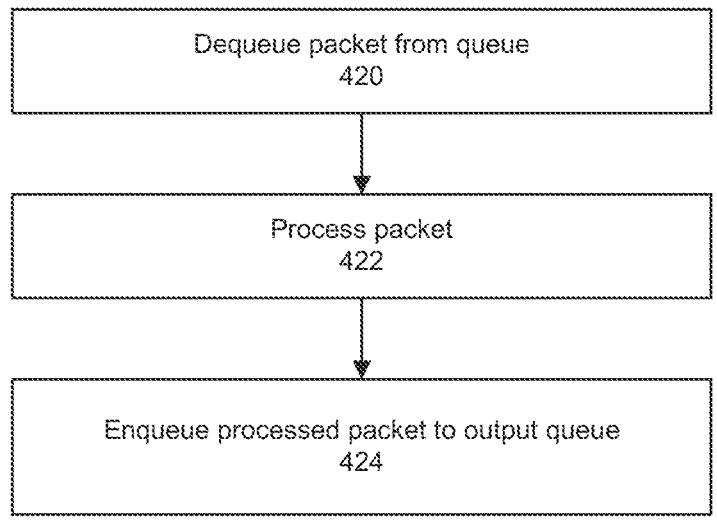

FIG. 4B depicts an example process where a selected one or more processing units can perform packet processing. The one or more processing units can be selected by a load balancer in the computing platform and perform packet processing of packets associated with a heavy flow or non-heavy flow. At 420, the one or more processing units can dequeue a packet from a queue by accessing a pointer to the packet and reading the packet from memory as identified by the pointer. At 422, the one or more processing units can process the packet. At 424, the one or more processing units can enqueue a pointer to the processed packet to an output queue associated with the load balancer or a queue in memory.

Figure 4C:
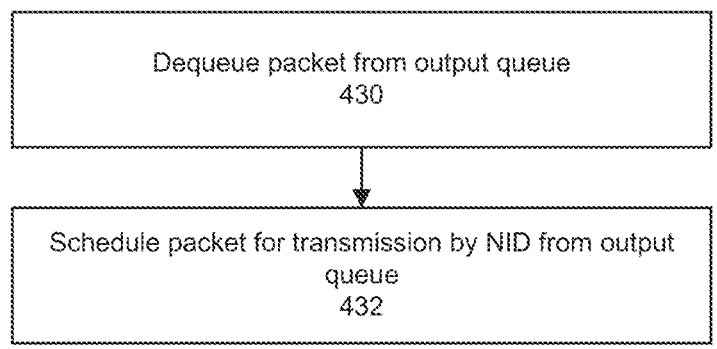

FIG. 4C depicts an example process to prepare a packet for transmission. At 430, a processing unit allocated to perform packet transmission scheduling can access a pointer to a packet from an output queue. The output queue can be associated with a load balancer or be independent from the load balancer. The pointer can refer to a memory region where a processed packet is stored. At 432, the processing unit can schedule the packet for transmission from the NID.

Figure 5:
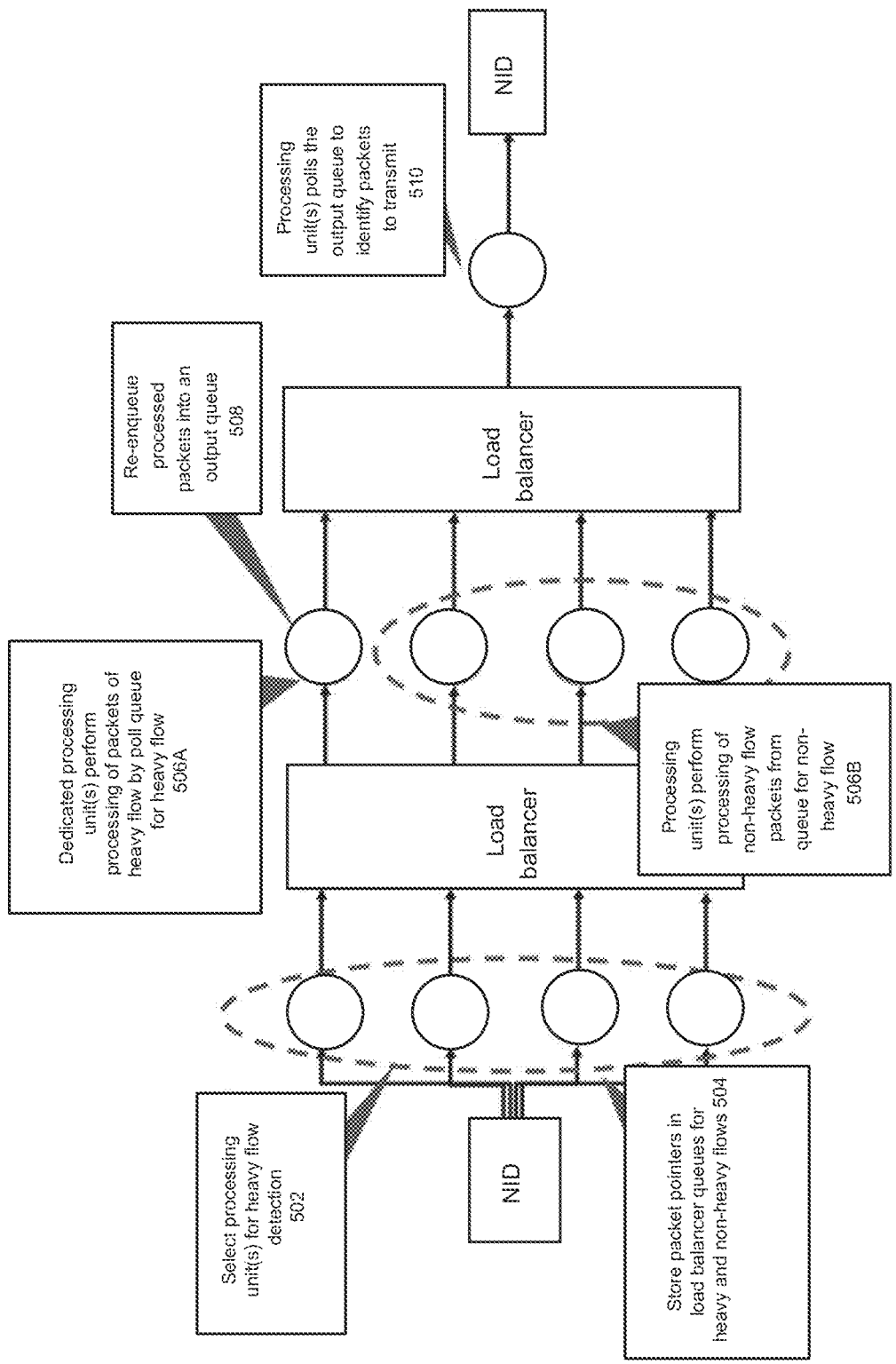
FIG. 5 depicts an example process.

FIG. 5 depicts an example process that can be used to direct packets for heavy flow detection, selection of one or more processing units to process packets, and transmission of processed packets. At 502, a network interface device (NID) can select one or more processing units to detect whether a flow is a heavy flow. For example, RSS can be used to select the one or more processing units to detect whether a flow is a heavy flow. Packets from a flow can be allocated by RSS to a same processing units so that one processing units can perform heavy hitter detection for entire flow. At 504, based on detection of the flow being heavy, pointers to the packets can be stored in a queue associated with a heavy flow. At 504, based on detection of the flow being non-heavy, pointers to the packets can be stored in a queue associated with a non-heavy flow. At 506A, the load balancer can select one or more processing units to perform processing of packets that are part of a heavy flow by accessing pointers from the queue that stores pointers to packets of a heavy flow. At 506B, the load balancer can select one or more processing units to perform processing of packets that are part of a non-heavy flow by accessing pointers from the queue that stores pointers to packets of a non-heavy flow. At 508, the load balancer can enqueue pointers to processed packets for transmission. For example, processed packets can have one or more header fields modified. At 510, a processing unit can poll for processed packets that are ready to transmit and cause the processed packets to be transmitted using a NID.

Figure 6:
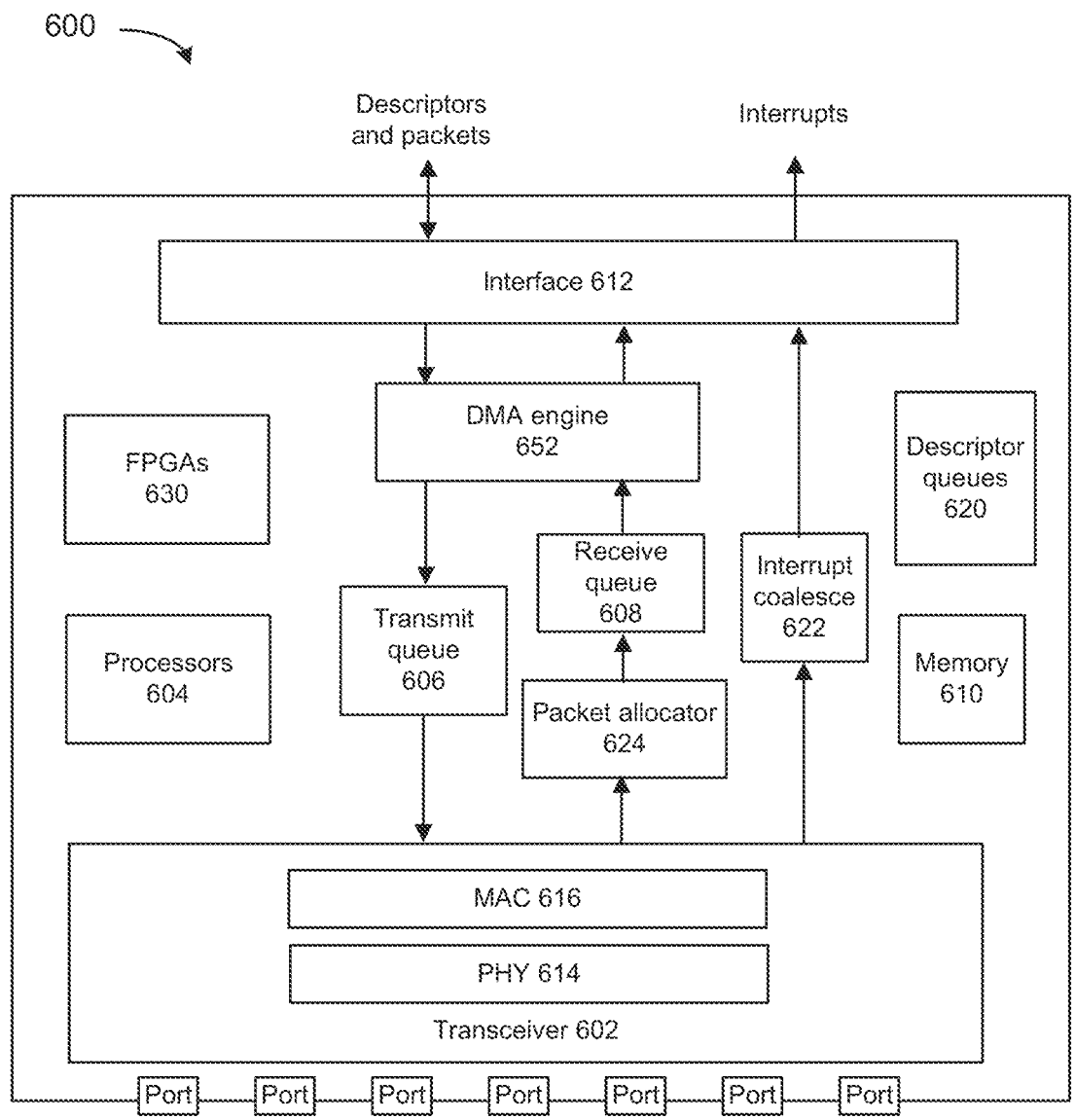
FIG. 6 depicts a network interface.

FIG. 6 depicts a network interface that can use embodiments or be used by embodiments. Various processing unit resources in the network interface can perform a count of packets received for a flow based on Nitrosketch and select at least one processing unit to perform heavy flow detection, as described herein. In some examples, network interface 600 can be implemented as a network interface controller, network interface card, a host fabric interface (HFI), or host bus adapter (HBA), and such examples can be interchangeable. Network interface 600 can be coupled to one or more servers using a bus, PCIe, CXL, or DDR. Network interface 600 may be embodied as part of a system-on-a-chip (SoC) that includes one or more processing units, or included on a multichip package that also contains one or more processing units.

Some examples of network device 600 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processing units to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 600 can include transceiver 602, processors 604, transmit queue 606, receive queue 608, memory 610, and bus interface 612, and DMA engine 652. Transceiver 602 can be capable of receiving and transmitting packets in conformance with the applicable protocols such as Ethernet as described in IEEE 802.3, although other protocols may be used. Transceiver 602 can receive and transmit packets from and to a network via a network medium (not depicted). Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to perform MAC address filtering on received packets, process MAC headers of received packets by verifying data integrity, remove preambles and padding, and provide packet content for processing by higher layers. MAC circuitry 616 can be configured to assemble data to be transmitted into packets, that include destination and source addresses along with network control information and error detection hash values.

Processors 604 can be any a combination of a: software executing processor, core, graphics processing unit (GPU), field programmable gate array (FPGA), application specific integrated circuit (ASIC), or other programmable hardware device that allow programming of network interface 600. For example, a "smart network interface" or SmartNIC can provide packet processing capabilities in the network interface using processors 604.

Processors 604 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can count packet receive rates as part of heavy flow detection, perform RSS to identify a processor to perform heavy flow detection, and/or notify a processor that a flow is potentially heavy. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 624 can provide distribution of received packets for processing by multiple CPUs or cores using RSS. When packet allocator 624 uses RSS, packet allocator 624 can calculate a hash or make another determination based on contents of a received packet to determine which processing unit or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer. In some examples, DMA engine 652 can perform encryption or decryption in connection with data copying.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Bus interface 612 can provide an interface with host device (not depicted). For example, bus interface 612 can be compatible with PCI, PCI Express, PCI-x, Serial ATA, and/or USB compatible interface (although other interconnection standards may be used).

Figure 7:
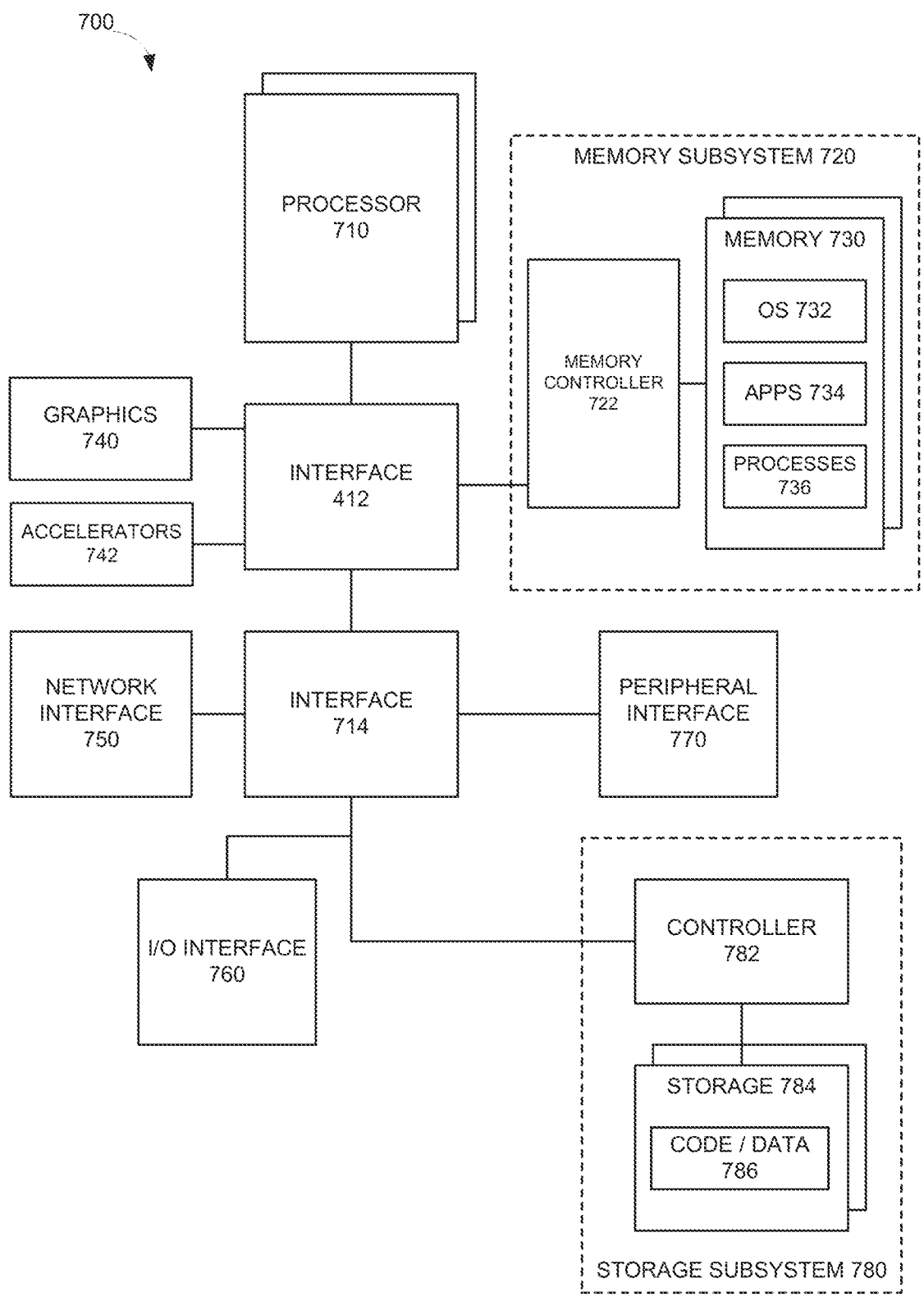
FIG. 7 depicts an example system.

FIG. 7 depicts a system. Various examples can be used by system 700 to detect heavy flows and allocate packets among processors as described herein. System 700 includes processor 710, which provides processing, operation management, and execution of instructions for system 700. Processor 710 can include any type of microprocessor, central processing unit (CPU), graphics processing unit (GPU), Accelerated Processing Unit (APU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1180p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a programmable or fixed function offload engine that can be accessed or used by a processor 710. For example, an accelerator among accelerators 742 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models. A load balancer, described herein, can be implemented using processor 710 or an accelerator 742.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 or a driver can configure network interface 750 or other device to perform heavy flow detection and select a processor or processing unit to perform heavy hitter detection, as described herein.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 750 can receive data from a remote device, which can include storing received data into memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 1046 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In some examples, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various examples can be used in a base station that supports communications using wired or wireless protocols (e.g., 3GPP Long Term Evolution (LTE) (4G) or 3GPP 5G), on-premises data centers, off-premises data centers, edge network elements, edge servers and switches, fog network elements, and/or hybrid data centers (e.g., data center that use virtualization, cloud and software-defined networking to deliver application workloads across physical data centers and distributed multi-cloud environments).

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An example of the devices, systems, and methods may include any one or more, and any combination of, the examples described below.

Example 1 includes one or more examples and a method including: processing packets of a heavy flow by: performing heavy flow detection in a first set of one or more processing units and performing the processing of packets of the heavy flow by a second set of one or more processing units, wherein the first set of one or more processing units and second set of one or more processing units are different.

Example 2 includes one or more examples and includes allocating pointers to packets associated with the heavy flow to a first set of one or more queues of a load balancer and the load balancer allocating the packets associated with the heavy flow to one or more processing units of the second set of one or more processing units based, at least in part on a packet receive rate of the packets associated with the heavy flow.

Example 3 includes one or more examples and includes at least one processing unit of the first set of one or more processing units providing pointers to packets of a non-heavy flow to a second set of one or more queues of the load balancer.

Example 4 includes one or more examples, wherein the load balancer comprises a dynamic load balancer.

Example 5 includes one or more examples, wherein the performing heavy flow detection comprises determining an approximate count of packets or total byte count of packets in a flow at a network interface device and performing binary tree traversal using the first set of one or more processing units and wherein at least one processing unit of the first set of one or more processing units manages a hash-table backed binary tree for one or more flows.

Example 6 includes one or more examples, wherein the performing heavy flow detection comprises performing a Nitrosketch scheme using the network interface device and the first set of one or more processing units.

Example 7 includes one or more examples, wherein the packets are distributed among the first set of one or more processing units using receive side scaling (RSS).

Example 8 includes one or more examples, and includes the second set of one or more processing units providing pointers to processed packets to a load balancer and the load balancer performing re-ordering the processed packets and making the processed packets available for access by a third set of one or more processing units.

Example 9 includes one or more examples, and includes an apparatus comprising: a device interface; a first set of one or more processing units; and a second set of one or more processing units, wherein: the first set of one or more processing units are to perform heavy flow detection for packets of a flow and the second set of one or more processing units are to perform processing of packets of a heavy flow, wherein the first set of one or more processing units and second set of one or more processing units are different.

Example 10 includes one or more examples, wherein: the first set of one or more processing units is to allocate pointers to packets associated with the heavy flow to a first set of one or more queues of a load balancer and the load balancer is to allocate the packets associated with the heavy flow to one or more processing units of the second set of one or more processing units based, at least in part on a packet receive rate of the packets associated with the heavy flow.

Example 11 includes one or more examples, wherein: at least one processing unit of the first set of one or more processing units is to provide pointers to packets of a non-heavy flow to a second set of one or more queues of the load balancer.

Example 12 includes one or more examples, wherein perform heavy flow detection comprises determine a count of packets in a flow at a network interface device and perform binary tree traversal using the first set of one or more processing units.

Example 13 includes one or more examples, wherein perform heavy flow detection comprises perform a Nitrosketch scheme using a network interface device and the first set of one or more processing units.

Example 14 includes one or more examples, wherein the packets are distributed among the first set of one or more processing units using receive side scaling (RSS).

Example 15 includes one or more examples, wherein the second set of one or more processing units provide pointers to processed packets to a load balancer and the load balancer is to perform re-ordering the processed packets and making the processed packets available for access by a third set of one or more processing units.

Example 16 includes one or more examples, and includes a computer-readable medium comprising instructions stored thereon, that if executed by a computing system, cause the computing system to: use a first set of one or more processing units to perform heavy flow detection for packets of a flow and use a second set of one or more processing units to perform processing of packets of a heavy flow, wherein the first set of one or more processing units and second set of one or more processing units are different.

Example 17 includes one or more examples, wherein the first set of one or more processing units is to allocate pointers to packets associated with the heavy flow to a first set of one or more queues of a load balancer and the load balancer is to allocate the packets associated with the heavy flow to one or more processing units of the second set of one or more processing units based, at least in part on a packet receive rate of the packets associated with the heavy flow.

Example 18 includes one or more examples, wherein at least one processing unit of the first set of one or more processing units is to provide pointers to packets of a non-heavy flow to a second set of one or more queues of the load balancer and perform heavy flow detection comprises determine a count of packets in a flow at a network interface device and perform binary tree traversal using the first set of one or more processing units.

Example 19 includes one or more examples, wherein perform heavy flow detection comprises perform a Nitrosketch scheme using the network interface device and the first set of one or more processing units.

Example 20 includes one or more examples, wherein: the second set of one or more processing units provide pointers to processed packets to a load balancer and the load balancer is to perform re-ordering the processed packets and making the processed packets available for access by a third set of one or more processing units.

What is claimed is:

1. A method comprising:
    processing packets of a heavy flow by:
        performing heavy flow detection in a network interface device and a first set of one or more processing units, wherein a flow comprises a heavy flow based on a receive rate of packets of the flow over a period of time at the network interface device and a first level, wherein the performing heavy flow detection comprises determining a byte count of the packets of the flow at the network interface device and performing binary tree traversal using the first set of one or more processing units and wherein at least one processing unit of the first set of one or more processing units manages a hash-table backed binary tree for the flow and
        performing the processing of the packets of the heavy flow by a second set of one or more processing units, wherein the first set of one or more processing units and the second set of one or more processing units are different.

2. The method of claim 1, comprising:
    allocating pointers to packets associated with the heavy flow to a first set of one or more queues of a load balancer and
    the load balancer allocating the packets associated with the heavy flow to one or more processing units of the second set of one or more processing units based, at least in part on a packet receive rate of the packets associated with the heavy flow.

3. The method of claim 2, comprising
at least one processing unit of the first set of one or more processing units: providing pointers to packets of a non-heavy flow to a second set of one or more queues of the load balancer, wherein a second flow comprises a non-heavy flow based on a receive rate of packets of the second flow over a period of time and a second level and
the load balancer allocating pointers to packets of the non-heavy flow to a third set of one or more processing units, wherein the third set of one or more processing units is different than the second set of one or more processing units.

4. The method of claim 2, wherein the load balancer comprises a dynamic load balancer.

5. The method of claim 1, wherein the performing heavy flow detection comprises performing a Nitrosketch scheme using the network interface device and the first set of one or more processing units.

6. The method of claim 1, wherein the packets are distributed among the first set of one or more processing units using receive side scaling (RSS).

7. The method of claim 1, comprising:
the second set of one or more processing units providing pointers to processed packets to a load balancer and
the load balancer performing re-ordering the processed packets and making the processed packets available for access by a third set of one or more processing units.

8. An apparatus comprising:
a device interface;
a first set of one or more processing units; and
a second set of one or more processing units, wherein:
the first set of one or more processing units are to perform heavy flow detection for packets of a flow and
the second set of one or more processing units are to perform processing of packets of a heavy flow, wherein:
the first set of one or more processing units and the second set of one or more processing units are different,
the flow comprises the heavy flow based on a receive rate of the packets of the flow over a period of time and a first level,
the perform heavy flow detection comprises determine a byte count of the packets of the flow at a network interface device and perform binary tree traversal using the first set of one or more processing units, and
at least one processing unit of the first set of one or more processing units is to manage a hash-table backed binary tree for the flow to perform the heavy flow detection.

9. The apparatus of claim 8, wherein:
the first set of one or more processing units is to allocate pointers to packets associated with the heavy flow to a first set of one or more queues of a load balancer and
the load balancer is to allocate the packets associated with the heavy flow to one or more processing units of the second set of one or more processing units based, at least in part on a packet receive rate of the packets associated with the heavy flow.

10. The apparatus of claim 9, wherein:
at least one processing unit of the first set of one or more processing units is to provide pointers to packets of a non-heavy flow to a second set of one or more queues of the load balancer, wherein:
a second flow comprises a non-heavy flow based on a receive rate of packets of the second flow over a period of time and a second level,
the load balancer is to allocate pointers to packets of the non-heavy flow to a third set of one or more processing units, and
the third set of one or more processing units is different than the second set of one or more processing units.

11. The apparatus of claim 8, wherein perform heavy flow detection comprises perform a Nitrosketch scheme using a network interface device and the first set of one or more processing units.

12. The apparatus of claim 8, wherein the packets are distributed among the first set of one or more processing units using receive side scaling (RSS).

13. The apparatus of claim 8, wherein
the second set of one or more processing units provide pointers to processed packets to a load balancer and
the load balancer is to perform re-ordering the processed packets and make the processed packets available for access by a third set of one or more processing units.

14. At least one non-transitory computer-readable medium comprising instructions stored thereon, that if executed by a computing system, cause the computing system to:
use a first set of one or more processing units to perform heavy flow detection for packets of a flow and
use a second set of one or more processing units to perform processing of packets of a heavy flow, wherein:
the first set of one or more processing units and second set of one or more processing units are different,
the flow comprises the heavy flow based on a receive rate of the packets of the flow over a period of time and a first level,
the perform heavy flow detection comprises determine a byte count of the packets of the flow at a network interface device and perform binary tree traversal using the first set of one or more processing units, and
at least one processing unit of the first set of one or more processing units is to manage a hash-table backed binary tree for the flow to perform the heavy flow detection.

15. The computer-readable medium of claim 14, wherein
the first set of one or more processing units is to allocate pointers to packets associated with the heavy flow to a first set of one or more queues of a load balancer and
the load balancer is to allocate the packets associated with the heavy flow to one or more processing units of the second set of one or more processing units based, at least in part on a packet receive rate of the packets associated with the heavy flow.

16. The computer-readable medium of claim 14, wherein
at least one processing unit of the first set of one or more processing units is to provide pointers to packets of a non-heavy flow to a second set of one or more queues of a load balancer
wherein:
a second flow comprises a non-heavy flow based on a receive rate of packets of the second flow over a period of time and a second level,
the load balancer is to allocate pointers to packets of the non-heavy flow to a third set of one or more processing units, and
the third set of one or more processing units is different than the second set of one or more processing units.

17. The computer-readable medium of claim 14, wherein perform heavy flow detection comprises perform a Nitrosketch scheme using the network interface device and the first set of one or more processing units.

18. The computer-readable medium of claim 14, wherein:
the second set of one or more processing units provide pointers to processed packets to a load balancer and
the load balancer is to perform re-ordering the processed packets and make the processed packets available for access by a third set of one or more processing units.

* * * * *